United States Patent
Weiss et al.

(10) Patent No.: US 6,366,725 B1
(45) Date of Patent: Apr. 2, 2002

(54) OPTICAL CABLE FOR ROUTING IN SEWERS

(75) Inventors: Alexander Weiss, Mönchengladbach (DE); Marta Garcia, Santander (ES); Stefan Richter, Hickory, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/481,597

(22) Filed: Jan. 12, 2000

(30) Foreign Application Priority Data

Jan. 13, 1999 (DE) .......................... 199 00 944

(51) Int. Cl.[7] .................................. G02B 6/44
(52) U.S. Cl. .................. 385/106; 385/100; 385/102; 385/104
(58) Field of Search .................. 385/100, 102, 385/104, 105, 106, 109, 110, 111, 112

(56) References Cited

U.S. PATENT DOCUMENTS

| | | | |
|---|---|---|---|
| 4,645,298 A | * | 2/1987 | Gartside, III ........... 385/106 X |
| 5,247,599 A | * | 9/1993 | Vyas et al. ................. 385/113 |
| 5,418,878 A | * | 5/1995 | Sass et al. ................... 385/101 |
| 5,666,452 A | * | 9/1997 | Deitz, Sr. et al. ........... 385/100 |
| 6,088,499 A | * | 7/2000 | Newton et al. .............. 385/112 |
| 6,226,430 B1 | * | 5/2001 | De Castro et al. .......... 385/113 |

FOREIGN PATENT DOCUMENTS

| | | |
|---|---|---|
| DE | 197 13 306 C1 | 4/1998 |
| EP | 0 461 794 A1 | 12/1991 |
| EP | 0 468 878 A1 | 1/1992 |
| EP | 0 733 925 A1 | 9/1996 |
| GB | 2 216 480 A | 9/1989 |

* cited by examiner

*Primary Examiner*—Brian Healy
(74) *Attorney, Agent, or Firm*—Sughrue Mion, PLLC

(57) ABSTRACT

An optical cable for routing in sewers, with a cable core and a metallic cladding (5) encircling the cable core in which the cable core is composed of several stranding elements (3) which have a sheath (2) in which several optical waveguides (1) are accommodated, wherein each stranding element (3) comprises a bundle of plural optical waveguides (1) running parallel to each other and unstranded or stranded with large pitch, each bundle is encircled by a sheath (2) which fits closely around the bundle, and plural such stranding elements (3) are stranded to the cable core with the cable core being built up exclusively from such bundles.

15 Claims, 1 Drawing Sheet

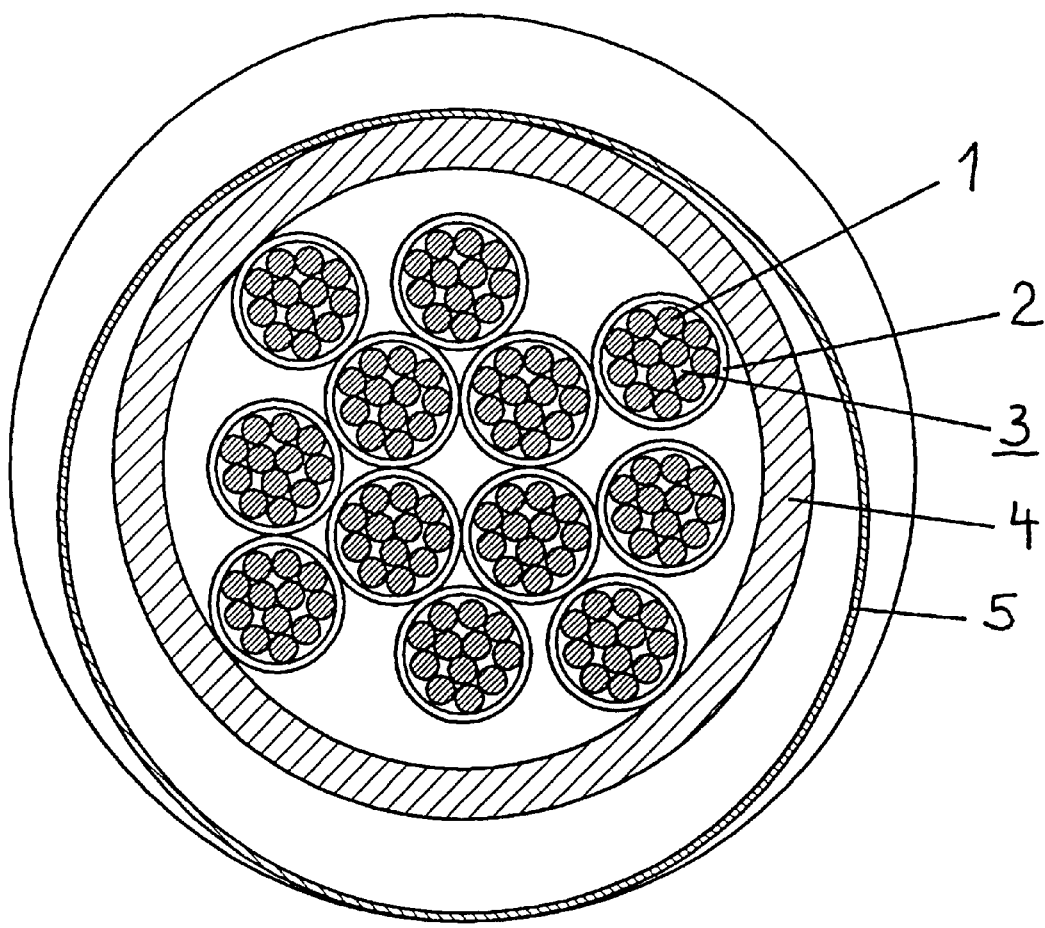

OPTICAL CABLE FOR ROUTING IN SEWERS

This application is based on and claims the benefit of German Patent Application No. 199 00 944.9 filed Jan. 13, 1999, which is incorporated by reference herein.

BACKGROUND OF THE INVENTION

The invention concerns an optical cable for routing in sewers having a cable core and a metallic cladding encircling the cable core, in which the cable core comprises several stranding elements each having a sheath encircling several optical waveguides.

From the Alcatel leaflet "Fast—the Optical Fiber Cable System for Cable Systems in Urban Sewers." an optical cable is known that consists of a central member around which six bundle conductors are stranded. A corrugated metallic outer cladding encircles the cable ropes. A plastic cladding can be arranged on the outer cladding. Every bundle conductor has 24 fibers resulting in a total of 144 fibers. The outside diameter of this known cable is 15 mm. The optical waveguides are present in the bundle units with an excess length.

The known cable covers all applications in sewers. Only materials which are resistant for the special requirements in sewers are used. Special cladding composites offer protection against aggressive chemicals. The metal cladding represents a second protective shield and provides the greatest degree of protection against rodents. The plastic outer cladding and the metal cladding hermetically protect the sensitive core of the optical waveguide cable like armor against the aggressive environment.

The large outside diameter, however, with respect to the number of the fibers accommodated is a drawback of this cable. A further drawback is the insufficient modularity, i.e., access to the individual fibers can be improved.

SUMMARY OF THE INVENTION

The present invention is therefore based on the object of improving the known optical cable such that with the same outside cable diameter, a higher number of fibers are contained in the cable and that the distribution of the fibers in the cable is optimized, i.e., a large number of wires is accommodated in the cable.

This object is achieved by an optical cable for routing in sewers having a cable core and a metallic cladding encircling the cable core, in which the cable core comprises several stranding elements each having a sheath encircling several optical waveguides, wherein: each stranding element comprises a bundle of a plural optical waveguides running substantially parallel to each other and being unstranded or stranded with large pitch; each bundle is encircled by a sheath tightly encircling the bundle; and plural said stranding elements are stranded to form the cable core, with the cable core being composed exclusively of such bundles.

Additional advantageous features of the invention will be apparent from the description below and the appended claims.

While in the known cable, the outside diameter of the cable core with a fiber count of 144 is around 7.8 mm, the outside diameter of the cable core of the cable according to the invention of the same fiber count is less than 6.0 mm.

BRIEF DESCRIPTION OF THE DRAWING

The invention is explained in greater detail by means of an exemplary embodiment schematically depicted in the single FIGURE.

DETAILED DESCRIPTION OF THE INVENTION

The cable core is composed of an inside or intermediate cladding 4 in which there is are plural stranding elements, designated below as fiber bundles. Each fiber bundle 3 is composed of several optical waveguides 1 which run parallel to each other and/or which are stranded with large pitch with each other and a sheath 2 that tightly encloses optical waveguides 1. The cable core is encircled by an outer cladding 5. The outer cladding is a longitudinally welded, corrugated metal pipe of stainless steel.

Fiber bundles 3 are stranded together with alternating direction of lay.

Sheath 2 serves only to hold optical waveguides 1 together, and should consist of a soft plastic so that sheath 2 is easily removable. Suitable materials are soft polyethylene, soft polyvinyl chloride etc. The wall thickness of sheath 2 is around 0.2 mm, so that with 12 optical waveguides 1, which have a diameter of 0.25 mm, the outside diameter of the fiber bundle 3 is approximately 1.5 mm.

In the FIGURE, an arrangement of fiber bundles 3 is depicted in which four fiber bundles 3 form the core, around which eight additional fiber bundles 3 are s stranded. This arrangement has the advantage that fiber bundles 3 can shift within cladding 5 in the event of a bend in the cable. A geometrically more favorable configuration of fiber bundles 3 is obtained if nine fiber bundles 3 are stranded around a core of three fiber bundles.

Sheaths 2 of the fiber bundles 3 can be colored differently for better distinction. Fiber bundles 3 can also be filled with a petroleum jelly in order to prevent a longitudinal migration of water which has penetrated.

Inside and/or intermediate cladding 4 consists of a thermoplastic, for example polyethylene. The space between the fiber bundle 3 and inner cladding 4, or in the case of a cable without inner cladding, between fiber bundles 3 and metal cladding 5 can also be filled with a material to prevent a longitudinal migration of water. Examples for this are petroleum jelly, yam or rovings with swelling agent.

Metal cladding 5 can also be encircled by a (not shown) cladding of abrasion-resistant plastic based on cross-linked polyethylene, polyurethane, etc.

The cable in accordance with the invention is particularly suitable in utility lines such as gas, water, and sewer lines and/or under similarly severe conditions. It is characterized by a relatively small outside diameter, a high fiber count, and great mechanical strength.

What is claimed is:

1. An optical cable for routing in sewers having a cable core and a metallic cladding encircling the cable core, in which the cable core comprises several stranding elements each having a sheath encircling several optical waveguides, wherein:
   a) each stranding element comprises a bundle of a plurality of optical waveguides running substantially parallel to each other and being unstranded or stranded with a large pitch;
   b) each bundle is encircled by a sheath tightly encircling the bundle so that the sheath contacts one or more of the optical waveguides within the sheath; and
   c) a plurality of said stranding elements are stranded to form the cable core, with the cable core being composed exclusively of such bundles.

2. An optical cable according to claim 1, wherein the stranding elements are stranded with alternating direction of lay.

3. An optical cable according to claim 1, wherein a total of twelve stranding elements are accommodated within the metallic cladding.

4. An optical cable for routing in sewers having a cable core and a metallic cladding encircling the cable core, in which the cable core comprises several stranding elements each having a sheath encircling several optical waveguides, wherein:
   a) each stranding element comprises a bundle of a plurality of optical waveguides running substantially parallel to each other and being unstranded or stranded with a large pitch;
   b) each bundle is encircled by a sheath tightly encircling the bundle; and
   c) a plurality of said stranding elements are stranded to form the cable core, with the cable core being composed exclusively of such bundles; wherein a total of twelve stranding elements are accommodated within the metallic cladding, and wherein four stranding elements are stranded together forming a center of the core, around which eight stranding elements are stranded.

5. An optical cable according to claim 1, wherein the metallic cladding is made up of a longitudinally welded, corrugated tube of stainless steel.

6. An optical cable according to claim 1, wherein the cable core is held together by spiral-shaped band which is applied to it.

7. An optical cable according to claim 1, wherein an inner cladding of a thermoplastic material is arranged between the cable core and outer cladding.

8. An optical cable according to claim 1, wherein the stranding elements are filled with a substance which prevents longitudinal migration of water.

9. An optical cable according to claim 1, wherein the sheath encircling the bundles consists of a soft, easily removable plastic.

10. An optical cable having a cable core and a metallic cladding encircling the cable core, in which the cable core comprises several stranding elements each having a sheath encircling several optical waveguides, wherein:
    a) each stranding element comprises a bundle of a plurality of optical waveguides running substantially parallel to each other and being unstranded or stranded with a large pitch;
    b) each bundle is encircled by a sheath tightly encircling the bundle; and
    c) a plurality of the stranding elements are stranded to form the cable core, with the cable core being composed exclusively of such bundles; wherein a total of twelve stranding elements are accommodated within the metallic cladding, and wherein three stranding elements are stranded together forming a center of the core, around which nine stranding elements are stranded.

11. An optical cable having a cable core and a metallic cladding encircling the cable core, in which the cable core comprises several stranding elements each having a sheath encircling several optical waveguides, wherein:
    a) each stranding element comprises a bundle of a plurality of optical waveguides;
    b) each bundle is encircled by a sheath tightly encircling the bundle; and
    c) a plurality of the stranding elements are stranded to form the cable core; and wherein another plurality of the stranding elements are stranded around the core.

12. The optical cable according to claim 11, wherein the plurality of optical waveguides for each bundle run substantially parallel to each other and are unstranded.

13. The optical cable according to claim 11, wherein the plurality of optical waveguides for each bundle run substantially parallel to each other and are stranded with a large pitch.

14. The optical cable according to claim 11, wherein each bundle is encircled by the sheath tightly encircling the bundle so that the sheath contacts one or more of the optical waveguides within the sheath.

15. The optical cable according to claim 11, wherein the cable core is composed exclusively of the plurality of the stranding elements that form the cable core.

* * * * *